Sept. 7, 1965   G. W. THELIN   3,204,478
CLUTCH ACTUATOR
Filed June 17, 1963   5 Sheets-Sheet 1
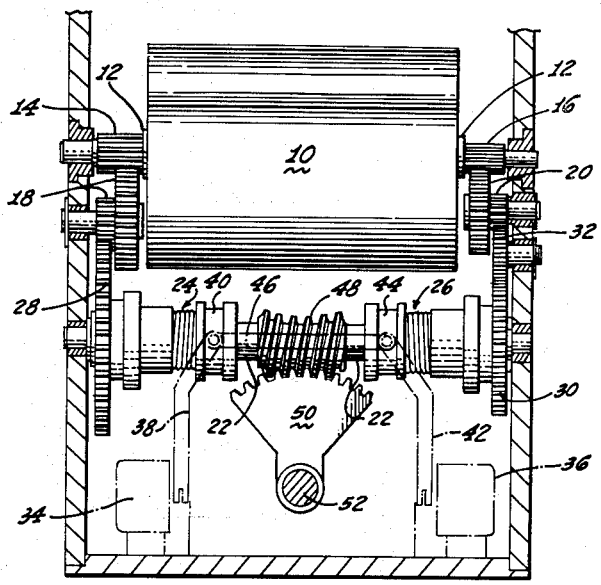
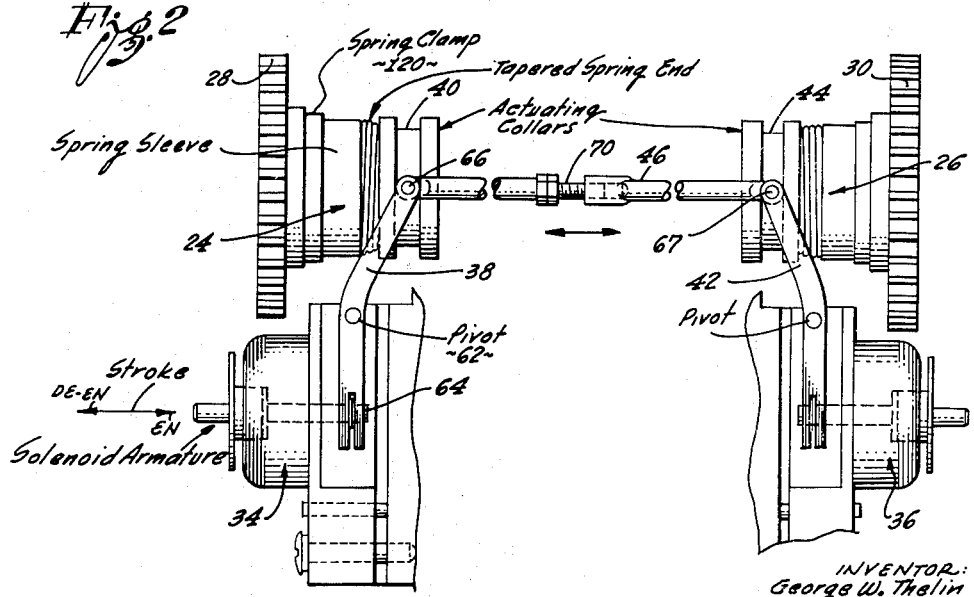
INVENTOR:
George W. Thelin
By Warren T. Jessup
Attorney

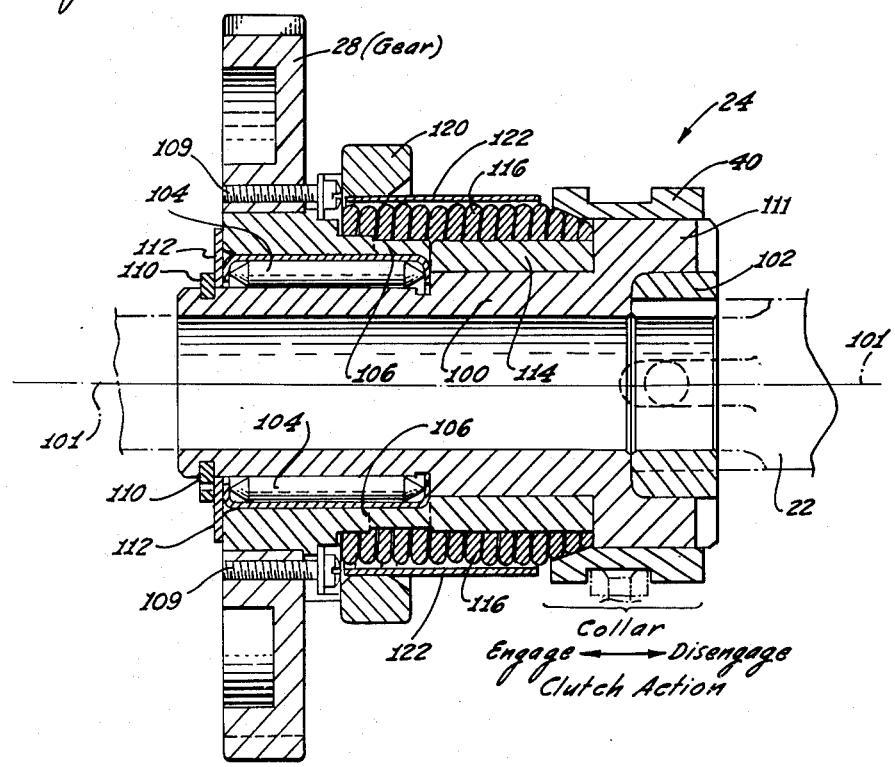

Sept. 7, 1965　　　　　G. W. THELIN　　　　　3,204,478
CLUTCH ACTUATOR
Filed June 17, 1963　　　　　　　　　　　5 Sheets-Sheet 3

GEORGE W. THELIN,
INVENTOR.

By
Warren T. Jessup
ATTORNEY.

Sept. 7, 1965  G. W. THELIN  3,204,478
CLUTCH ACTUATOR

Filed June 17, 1963  5 Sheets-Sheet 4

INVENTOR.
GEORGE W. THELIN,
By Warren T. Jessup
ATTORNEY

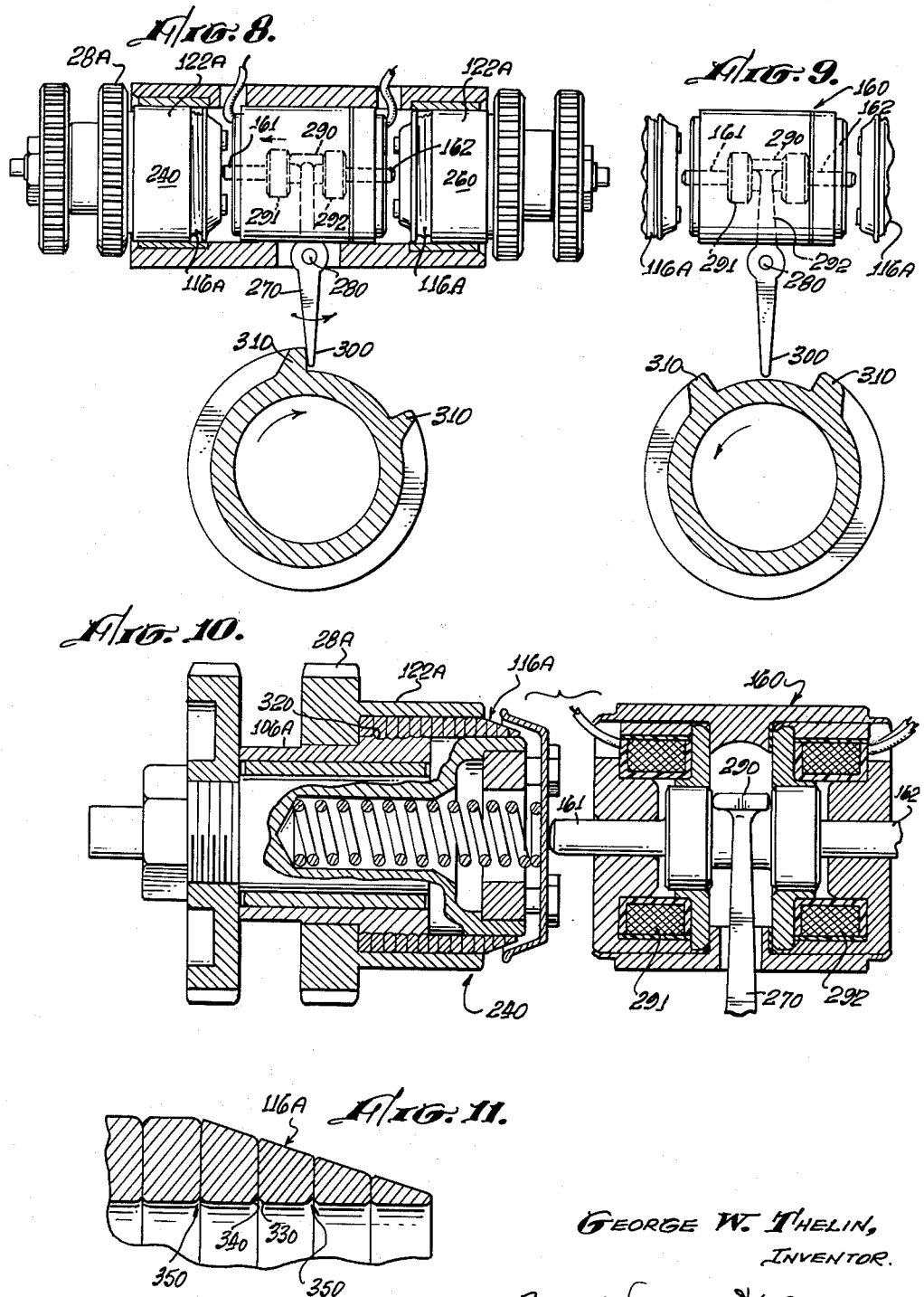

United States Patent Office 3,204,478
Patented Sept. 7, 1965

3,204,478
CLUTCH ACTUATOR
George W. Thelin, Whittier, Calif., assignor to American Electronics, Inc., a corporation of California
Filed June 17, 1963, Ser. No. 288,429
4 Claims. (Cl. 74—388)

This is a continuation in part of application Serial No. 95,887, filed March 15, 1961, now abandoned, for a device entitled Clutch Actuator, by George W. Thelin.

This invention relates to an improved electro-mechanical actuator assembly for imparting rotation to an output shaft from one or more uni-directional, continuously driven input shafts; and it also relates to an improved spring clutch assembly for use in such an actuator.

The actuator assembly of the invention has widespread utility and application. One particular application, for example, is in the control of a steering member. When movement of the steering member in one direction is needed, a first solenoid in the improved actuator assembly of the invention is activated which causes one of a pair of spring clutches to become engaged. Conversely, when movement of the steering member in the opposite direction is required, a second solenoid in the actuator assembly of the invention is activated, which causes the other of the pair of spring clutches to become engaged. The solenoids are preferably mechanically or electrically interlocked to prevent the simultaneous engagement of both the spring clutches. It will become apparent as the description proceeds that a single solenoid may be used, if desired, to effectuate the above-mentioned controls in the actuator assembly of the invention.

In addition, the improved actuator assembly of the invention is advantageous in that it is capable of assuming a neutral position when neither solenoid is activated, and it exhibits desired load holding capabilities in the neutral position.

It is an object of the invention to provide an improved electro-mechanical actuator assembly which is capable of being rapidly controlled to impart rotation to an output shaft in one direction or another.

Another object of the invention is to provide such an improved actuator assembly which includes a continuously energized or activated electric motor which imparts continuous uni-directional rotation to an input shaft, and in which the control of the output shaft is effectuated without the need for reversing or stopping the motor or the rotation of the input shaft.

Another object of the invention is to provide such an improved electro-mechanical actuator assembly in which backlash is reduced to a minimum.

Another object of this invention is to provide a mechanical interlock between the output of the actuator and the clutch assembly adapted to override the clutch actuation at the end of the desired rotational extent of the output shaft.

A further object is to provide such an improved electro-mechanical actuator assembly which is simple in construction and reliable in operation.

A still further object is to provide such an improved electro-mechanical actuator assembly which is relatively light in weight.

Yet another object of the invention is to provide an improved spring clutch for use, for example, in the electro-mechanical actuator assembly referred to above.

The improved spring clutch unit referred to in the preceding paragraph includes an outer sleeve which embraces a driven coil spring element, and which limits the radial enlargement of the coil spring when the clutch is not engaged. The clutch is engaged by clamping the free end of the coil spring to the hub of the clutch, this causing the coil spring to wrap itself inwardly around the hub assembly from its limited enlarged radial position. The particular construction referred to herein has certain advantages in that it provides a controlled extremely short time interval between the activation of the clutch and the actual engagement thereof.

The outer sleeve of the spring clutch described in the preceding paragraph, therefore, limits the radial expansion of the spring which is caused by restoring force of free diameter of spring or by centrifugal force as the clutch is freely spinning in a disengaged condition, and thereby limits the outward radial enlargement of the spring. This means that there always is a constant radial distance for the spring to compress which is independent of the speed of the clutch assembly. This, as noted, provides for a relatively constant and rapid response time in the clutch, and this response time is independent of the rotational speeds of the assembly.

Another feature in the particular clutch embodiment to be described is the configuration of an actuating collar which is reciprocally movable from a first to a second position. This collar serves to clamp the clutch spring when in its second position and to cause the clutch to become engaged. This actuating collar has a conical face which engages the spring. This configuration of the face of the actuating collar gives a radial component of force to compress one end of the spring radially inwardly against the hub of the clutch for a rapid and cumulative coupling effect. When that end of the spring actually engages the clutch hub, the subsequent rotation of the other end of the spring causes it tightly to wrap itself around the hub, to impart rotational motion thereto.

The conical configuration of the face of the actuating collar is also advantageous when the clutch is first disengaged in that the resulting centrifugal force, as the spring begins to turn with respect to the hub and collar, imparts an axial force component to the collar which tends quickly to throw it out of engagement.

Also, another object of the invention is to provide a new and improved escape within the spring clutch for oil in order to prevent creation of oil entrapment and reduction of clutch gripping force thereby.

In the drawings:

FIGURE 1 illustrates an electro-magnetic actuator assembly constructed in accordance with one of the embodiments of the invention;

FIGURE 2 is a fragmentary diagram illustrating the manner in which a pair of solenoids in the assembly of FIGURE 1 may be linked to a pair of clutches in the assembly and mechanically interlocked to prevent the simultaneous engagement of the clutches;

FIGURE 3 is a side sectional view of a spring clutch which may be used in the assembly of FIGURE 1.

FIGURE 8 is a section view taken along the line 8—8 of FIGURE 6;

FIGURE 9 is partial view of the apparatus shown in FIGURE 8 with the shaft and actuating device in a neutral position;

FIGURE 10 is an illustration of the improved new spring clutch assembly and the solenoid control means for selectively activating the clutch; and FIGURE 11 is a greatly enlarged fragment of the spring structure shown in FIGURE 10 illustrating the oil relief surfaces between the springs.

Figure 4:
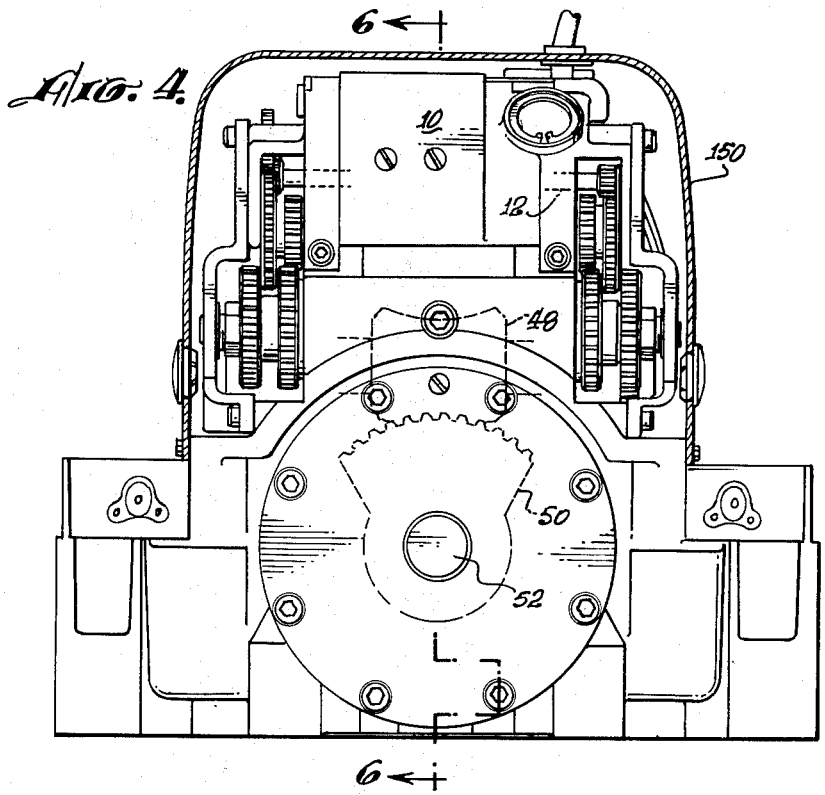
FIGURE 4 is an elevation in section, of a commercial embodiment of the invention which employs the safety interlock to limit actuation.

The assembly of FIGURE 1 includes a motor 10 which may, for example, be a 100 volt direct current motor. The motor is used to impart continuous rotation to its drive shaft 12 which extends from both sides of the motor housing. A spur gear 14 is keyed to one end of the drive shaft 12, and a spur gear 16 is keyed to the other end of the drive shaft 12. A pair of speed reducer idler gears 18 are coupled to the spur gear 14, and a similar pair of speed reducer idlers 20 are coupled to the spur gear 16.

The assembly of FIGURE 1 includes a rotatably mounted worm shaft 22. A pair of spring clutches 24 and 26 are mounted on the opposite ends of the worm shaft 22. A gear 28 is rotatably mounted on the hub of the spring clutch 24, as will be described, and a gear 30 is rotatably mounted on the hub of the spring clutch 26. The gear 28 is coupled to the idler gear pair 18 to be driven in a first rotational direction by the gear 14 on the drive shaft 12 of the motor 10. A further idler 32 is interposed between the gear 30 and the idler gear pair 20, so that the gear 30 is driven in the opposite direction by the gear 16 on the motor drive shaft 12.

The total speed reduction of the gears described above may be such that an 8:1 reduction ratio in the speed of rotation of the worm shaft 22 as compared with the drive shaft 12 is obtained.

The assembly of FIGURE 1 includes a pair of solenoids 34 and 36. An actuating arm 38 couples the solenoid 34 mechanically to an actuating collar 40 of the clutch 24. A similar actuating arm 42 mechanically couples the solenoid 36 to an actuating collar 44 of the clutch 26. An adjustable inter-lock or linkage 46 is coupled between the actuating arms 38 and 42 to prevent the simultaneous engagement of the clutches 24 and 26.

The arrangement is such that when the solenoid 34 is energized, the clutch 24 is activated so that the motor 10 drives the worm shaft 22 in a first rotational direction. On the other hand, when the solenoid 36 is energized, the clutch 24 is disengaged and the clutch 26 is engaged. The engagement of the clutch 26 causes the motor 10 to drive the worm shaft 22 in the opposite rotational direction. Therefore, a rapid and selective rotational drive of the worm shaft 22 is obtained, and this drive may be rapidly reversed, merely by interchanging the energization of the solenoids 34 and 36.

A double enveloping hourglass-shaped worm 48 is mounted on the worm shaft 22. A worm gear segment 50 is keyed to an output shaft 52, and the worm gear segment 50 is coupled in meshing relationship with the worm 48. In this manner, power is transmitted from the motor 10 to the output shaft 52. The speed reduction of the worm and gear may, for example, be of the order of 50:1, so that a total speed reduction of 400:1 between the drive shaft 12 and the output shaft 52 may be provided.

The worm gear 50 may be a gear segment, as illustrated, to provide, for example, 32 degrees of travel to the output shaft 52. The worm 48 and worm gear segment 50 are preferably machined to be self-locking, that is, so that no rotation can take place in either direction of the output shaft 52 without power being supplied to worm 48.

As shown more particularly in FIGURE 2, the solenoid 34 is coupled to the actuating collar 40 of the spring clutch 24 by means of the actuating arm 38. The actuating arm 38 is pivoted to the frame of the assembly by a pivot pin 62, and it is coupled at its lower end to the armature 64 of the solenoid 34. The upper end of the actuating arm 38 is pivoted to the actuating collar 40 by means of a pivot pin 66.

When the solenoid 34 is energized, its armature 64 is caused to move to the right in FIGURE 2. This causes the actuating arm 38 to move the actuating collar 40 to the left so as to cause the spring clutch 24 to become engaged, in a manner to be described. In like manner, the solenoid 36 is coupled to the actuating collar 44 of the spring clutch 26 by the actuating arm 42.

The linkage 46 is coupled between the actuating arms 38 and 42 at the points 66 and 67 at which these arms are pivoted to the respective collars 40 and 44. The two actuating collars 40 and 44 are therefore linked to the solenoids 34 and 36 by the actuating arms 38 and 42. These actuating arms are in the form of yokes which are pivoted to the actuating collars 40 and 44, as described above. The linkage 46 serves to link the collars 40 and 44 together to provide an interlock. This linkage prevents both clutches from being engaged simultaneously. In the illustrated embodiment, the linkage 46 is shown as being externally mounted. Any suitable interconnection to prevent simultaneous engagement may be substituted. The length of the linkage 46 may be made adjustable by a rotatable threaded portion 70. This permits the length of the linkage 68 to be adjusted thereby to adjust the criticality of the operation of the collars 40 and 44, and therefore of the spring clutches 24 and 26.

The spring clutch 24 is shown in more detail in FIGURE 3. It will be understood that the spring clutch 26 preferably has the same construction. As shown in FIGURE 3, the spring clutch 24 includes a hub 100 which is rotatable about an axis 101. The hub 100 includes an insert 102 which has a splined inner surface and which serves to couple the hub 100 to the worm shaft 22.

The gear 28, which constitutes the input drive member of the clutch assembly, is rotatably mounted on the hub 100 by means of a suitable needle roller bearing 104. As illustrated in FIGURE 3, the gear 28 includes a hub portion 106 which extends axially from the gear to the right in FIGURE 3 and is secured thereto by bolts 109.

This hub portion is rotatably mounted on the clutch hub 100 by the roller bearing 104. The assembly is held in place by a snap ring 110 and a washer 112.

An annular, hardened insert 114 is press fitted on the clutch hub 100 against a shoulder 111 formed on the hub, and serves as a clutch facing against which a spring 116 seizes. The outer peripheral surface of the insert 114 is in substantial alignment with the outer peripheral surface of the right hand portion of the hub 106.

The clutch spring 116 is clamped to the hub 106 by a clamp collar 120. This clamp 120 also serves to mount an outer sleeve 122 on the hub 106. The sleeve 122 is mounted coaxially of the spring 116 about axis 101. The sleeve 122 is spaced radially from the spring 116, and it serves to limit the radial enlargement of the spring, due to centrifugal forces as the assembly rotates. The collar 40, as illustrated, is splined on the hub 100 to move axially, but not rotationally, with respect to the hub. The left hand face of the actuator collar 40 has a conical configuration, and it serves to clamp the right hand end of the spring 116, which is tapered (as shown), against the surface of the annular insert 114, when the collar 40 is moved to the left in FIGURE 3. This action causes the spring 116 to be wrapped tightly around the hub assembly 100, 114, so that rotational motion is translated from the gear 28 to the hub 100.

When the collar 40 is in the right position in FIGURE 3, the rotation of the gear 28 causes the spring 116 and the limiting sleeve 120 to rotate with respect to the hub 100 and the insert 114. This rotation of the gear 28, and the spring 116 and sleeve 122 is unimpeded, because of the bearing 104 between the hub 106 and the hub 100. As these elements freely rotate, the resulting centrifugal forces cause the spring 116 to tend to enlarge in a radial direction. However, this enlargement is limited by the sleeve 122. This means that the time of response of the clutch is relatively short when the collar 40 is moved to its clutch-engaging position and that the time of response is independent of the rotational speed of the elements.

As mentioned, when the clutch 24 is engaged, the spring 116 wraps inwardly around the insert 114 of the hub 100. This is produced by the actuating collar 40 whose conical end face slips over the tapered right hand end of the spring 116 to cause clutch engagement. As soon as the tapered right hand end of the spring is clamped down on the annular insert 114, the action is cumulative, and the spring immediately tightens on the hub assembly. The conical end of the actuating collar 40 forces the tapered end of the spring axially to the left and radially inwardly for quick engagement of the clutch. Upon disengagement, the conical edge of the collar is engaged by the spring and forced with an axial component of force which assists in moving the collar back to its disengaged position so that extremely rapid disengagement of the clutch may be realized.

The invention provides, therefore, an improved electromechanical actuator assembly in which an electric motor is used continuously to rotate its drive shaft, and in which the drive shaft is selectively coupled to an output shaft for the reverse rotational control of the output shaft, in the manner described.

As mentioned above, the assembly of the invention is most advantageous in that it permits the rapid control of the output shaft, and the assembly also is extremely flexible, in that it permits any of a desired variety of controls to be used initiated by the output shaft itself, or by independent means, for effecting a desired control of the output shaft.

Moreover, the assembly of the invention is advantageous in that it lends itself to convenient design, so that the control of the output shaft may be in accordance wih any of a variety of desired characteristics.

As also described, the disclosed embodiment of the invention utilizes a pair of spring clutches, each of which incorporates improved and advantageous features as described above.

As noted above, the actuator assembly of the invention is tri-positional, in that it is capable not only of providing selective rotation of the worm shaft in either direction; but also of exhibiting a neutral position with load holding capabilities of the output shaft, and in which neutral position the output shaft is held stationary by the worm gear segment.

The speed of actuation of the actuator assembly, or response time, is governed by the time required for the spring 116 to wind up which, in turn, depends on the number of disengaged turns of the spring and the clearance between the full open and full wrap condition of the spring as established by the sleeve member 122.

The response time of the actuator assembly can also be controlled by adjusting the travel distance of the solenoid armatures, or by adjusting the values of the electrical inputs to the solenoids. These latter mechanical and electrical adjustments can be used to obtain matched and uniform performance of the assembly for rotation of the worm shaft in either direction.

FIGURE 4 is an elevational view of a modification. In FIGURE 4, a housing 150 is broken away to reveal the location of motor 10 and shaft 12. The gear trains, although placed somewhat differently than illustrated in FIGURE 1, are essentially identical in function and operate to drive worm gear 48, segment 50, and ultimately the output shaft 52.

Figure 5:
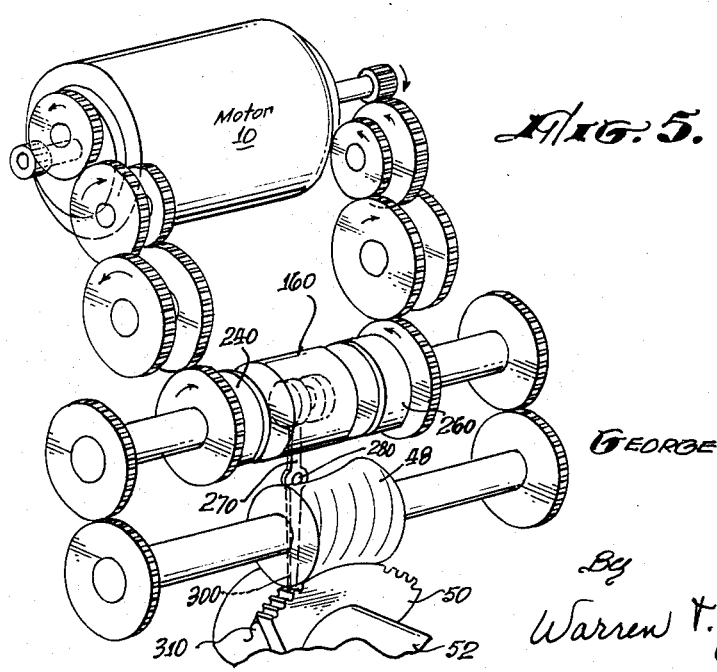
FIGURE 5 is a schematic illustration of the operative relationship of the parts as employed in the structure shown in FIGURE 4.

FIGURE 5 is a schematic representation of the arrangement of this modification shown in FIGURE 4. The gear trains in FIGURE 5 operate through opposed clutches 240 and 260 to drive the worm 48 in a right or left hand direction, as determined by solenoid device 160.

Solenoid device 160 may be better seen in FIGURE 10. Note that this device 160 is located in axial alignment with the clutches, rather than being positioned below the clutches. The linkage is a direct contact through plungers 161 and 162. The construction and operation of the solenoid device 160 will be obvious from the illustrated construction.

This modification provides a safety device not shown in the modification of FIGURE 1. This safety device is embodied in a stop limitation means which prevents overactuation of the output shaft if the signal to the solenoid device 160 continues beyond the operational limits intended for the output shaft.

This embodiment of the invention is quite widely used for devices such as guide fin control for missiles. Hence, it may be that a guidance system signal will desire a greater correction for the missile and hence send correction signals to the device 160. However, after optimum adjustment has been made, whether or not the missile is on course, correction can not be obtained by further adjustment. Hence, the safety device sets a limit of adjustment regardless of control signals from outside sources to the solenoid device 160.

The safety device is embodied essentially in a leaf spring type lever 270 which is pivotally mounted on a pivot 280. See FIGURE 8 of the drawings. This permits overtravel without breakage.

The lever 270 has a hammer shaped end 290 positioned between the separate solenoids 291 and 292, and hence will move with these solenoids and will be in position to exert a force opposing them. Spring characteristics permit overtravel causing engagement of clutch in opposite direction of rotation. Amount of flexure dependent on allowable overtravel and force to overcome solenoid engagement force. The first event will be disengagement of the energized clutch. This results in a neutral condition. Overtravel will then result in engagement of the opposite clutch to assure abrupt stopping.

Lever 270 has a probe end 300 which serves as a drive receiving end or handle to operate lever 270.

The out shaft 52 is equipped with projections 310 which serve as limit stops. In FIGURE 8 one of these projections 310 is shown in contact with probe end 300 and hence exerting a force upon solenoid 291 in the direction of the arrow. Therefore, if a signal system is directing the operation of clutch 260, but the output shaft has reached the limit position shown in FIGURE 8, the mechanical interlock system will take over and disengage the solenoid device 160 against the electrical urge commanded by the signal system and will disengage the clutch 260. Because of the worm and gear relationship of the drive, the output shaft 52 will stay in the position illustrated in FIGURE 8 until a signal is received reversing the solenoid device 160 and causing the clutch 240 to become activated. A neutral position, wherein the output shaft is halfway between the stop position as shown in FIGURE 9.

Figure 6:
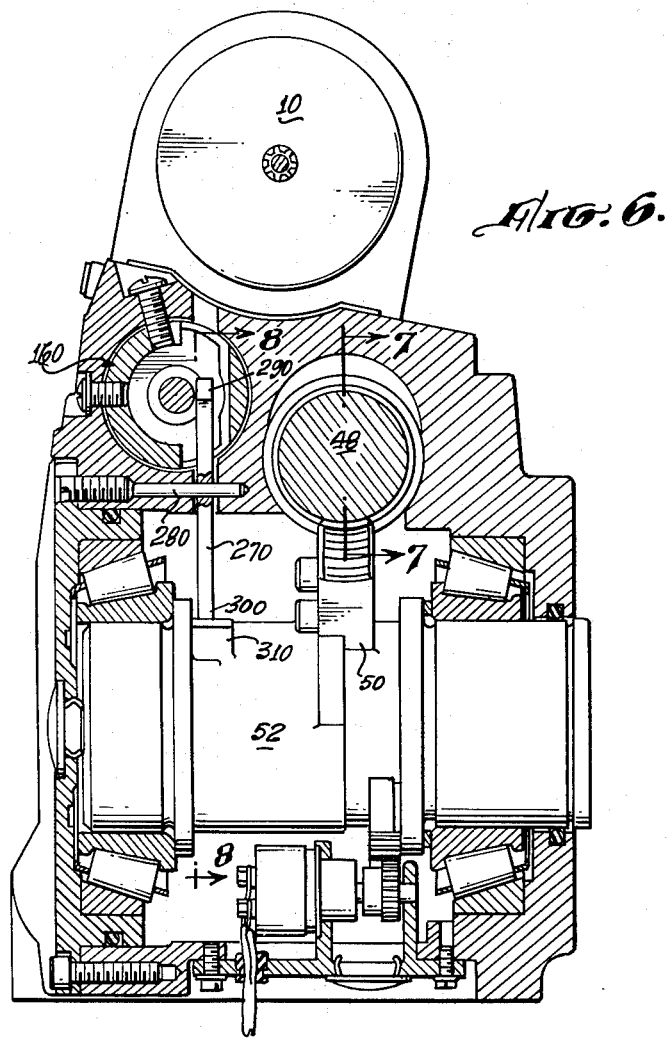
FIGURE 6 is a section view taken along the lines 6—6 of FIGURE 4.
Figure 7:
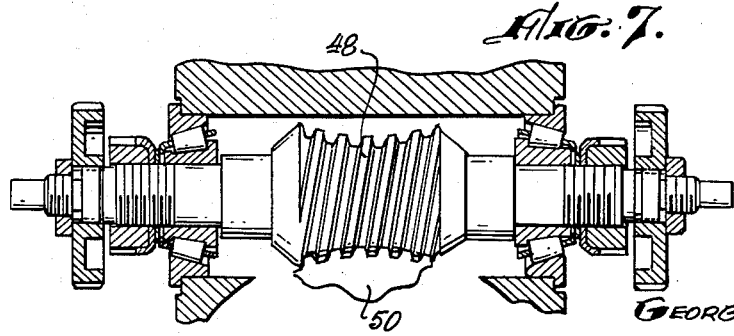
FIGURE 7 is a section view taken along the lines 7—7 of FIGURE 6.

The location of the lever 270 may be observed in FIGURE 6, and the location of the worm gear and shaft with respect to the clutches may be seen in FIGURE 7.

In FIGURE 10, the clutch 240 is illustrated in greater detail. Clutch 240 differs in detail from the clutch set forth in FIGURE 3 in that a spiral groove 320 is employed to hold a spring 116–A in uniform spiral relationship. In the drawing, in order to illustrate this groove 320, the depth is greatly exaggerated. In actual practice, the depth of groove 320 may be in the order of .0010 inch.

The gear 28–A is provided with a sleeve 122A which is a press fit over the outside of the spring 116A holding the spring tight into the shallow groove 320 for strong engagement with hub 106A.

Additionally, a strong cement material is employed to further cause a positive engagement. In the prior art practice, springs in clutches of this type have been provided with a bend portion which engages into a structural member of the clutch, but such bent parts have been found to cause extreme stress concentration, which results in failure. The suddenness of changes and the stress and strain relationship in spring devices for this type of clutching are extreme. The grooves help to distribute the stress, and the tight clamping of the spring into the grooves, together with cement material, causes an extremely reliable and strong bond which needs no mechanical interlock.

Finally it was found that a precision made spring 116A operating over a smooth clutching surface, would slip if oil were present, although pressures were employed which should exceed the film strength of the oil employed. Oil is necessary for protection, but is not acceptable if the immediate clutching action is slowed down to any extent whatsoever.

It was discovered that the extreme precision of the springs and the tight wrap of the convolutions formed such an impervious enclosure that the small amount of oil present actually was compressed into an exceedingly thin, but effective, trapped body of oil under pressure.

Therefore, it was discovered that when the edge of the convolutions were relieved by radius or chamber at the surfaces 330 and 340 to cause a recess notch 350, there was provided a space for the escape of the oil and hence relief of this condition and a production of a clutch which has all of the desirable characteristics and yet can be operated with oil present on the gripping surfaces. Also, centrifugal force will place oil on the exterior spring surface area, and therefore the convolutions are relieved by radius or chamber for the same reason.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claim.

What is claimed is:

1. In an electro-mechanical actuator assembly having an output shaft:
   a uni-directional prime mover power means, a first power train from said prime mover to said output shaft operable to drive said output shaft in a first rotational direction, a first clutch in said first power train;
   a second power train from said prime mover to said output shaft operable to drive said output shaft in a second rotational direction, a second clutch in said second power train;
   control means to selectively activate said first and second clutches to control the direction of rotation of said output shaft; and
   a mechanical drive linkage means for driving said first and second clutch to a disconnect condition, and means carried by said shaft for operating said linkage means to de-activate said first clutch upon rotation of said shaft to a limit position in a first rotational direction, and for operating said linkage means to de-activate said second clutch upon rotation of said shaft to a limit position in a second rotational direction.

2. An electro-mechanical actuator assembly including:
   a drive motor;
   a worm shaft having a worm mounted thereon; first means including a first clutch for coupling said drive motor to said worm shaft for imparting rotational motion to said worm shaft in a first direction, second means including a second clutch for coupling said drive motor to said worm shaft for imparting rotational motion to said worm shaft in a second direction opposite to said first direction;
   an output shaft, a worm gear mounted on said output shaft in drive receiving engagement with said worm;
   a control solenoid having an output linkage operable in a first direction to activate said first clutch and operable in a second direction to activate said second clutch, said linkage having a neutral position between said clutch activation position; and
   mechanical linkage means operable by interconnection with said output shaft for forcing said output linkage to said neutral position upon operation of the output shaft to a pre-determined rotational limit, regardless of electrical activation of said control solenoid.

3. The actuator assembly defined in claim 2 and in which said linkage means including a mechanical lever coupling pivotally mounted to transmit force from a stop shoulder on the output shaft to override the force of the electrically energized solenoid at the end of the desired shaft movement.

4. An electro-mechanical actuator assembly including:
   a drive motor including a drive shaft;
   a worm shaft having a worm mounted thereon;
   first means including a first plurality of gears and a first spring clutch for coupling said drive motor to said worm shaft to impart rotational motion to said worm shaft in a first direction, second means including a second plurality of gears and a second spring clutch for coupling said drive motor to said worm shaft to impart rotational motion to said worm shaft in a second direction opposite to said first direction;
   an output shaft, a gear mounted on said output shaft in drive receiving engagement with said worm;
   control means including electric solenoid means coupled to said first spring clutch and to said second spring clutch for selectively causing the same to be energized and de-energized; and
   linkage means interconnecting said output shaft with said first and second clutches and operable to de-activate said clutches at a predetermined rotative position against the activating action of said control means.

References Cited by the Examiner

UNITED STATES PATENTS

| | | | |
|---|---|---|---|
| 1,814,424 | 7/31 | Barr | 74—365 |
| 2,052,961 | 9/36 | Bonham. | |
| 2,171,715 | 9/39 | Sinclair | 74—377 X |
| 2,475,432 | 7/49 | Marihart. | |
| 2,523,151 | 9/50 | Schneider. | |
| 2,622,450 | 12/52 | Gorske et al. | |
| 2,643,749 | 6/53 | Greenlee. | |
| 2,652,134 | 9/53 | Montooth. | |
| 2,669,331 | 2/54 | Dudis et al. | |
| 2,778,238 | 1/57 | Emrick | 74—377 |
| 2,825,236 | 3/58 | Nabstedt et al. | 74—377 |
| 2,833,383 | 5/58 | Christensen. | |
| 2,836,085 | 5/58 | Snyder | 74—368 X |
| 2,872,828 | 2/59 | Brogdon | 74—368 |
| 2,977,812 | 4/61 | Hoof | 74—323 X |

DON A. WAITE, *Primary Examiner.*